US011063663B2

(12) United States Patent
Schmogrow et al.

(10) Patent No.: US 11,063,663 B2
(45) Date of Patent: Jul. 13, 2021

(54) TRANSPONDER BASED ACTIVE MONITORING OF OPTICAL NETWORKS

(71) Applicant: Google LLC, Mountain View, CA (US)

(72) Inventors: Rene Schmogrow, San Jose, CA (US); Mattia Cantono, San Jose, CA (US); Matthew Eldred Newland, San Jose, CA (US); Jia Shern Ngai, San Jose, CA (US); Kevin Croussore, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/701,935

(22) Filed: Dec. 3, 2019

(65) Prior Publication Data

US 2021/0167850 A1    Jun. 3, 2021

(51) Int. Cl.
| | | |
|---|---|---|
| *H04B 10/077* | (2013.01) | |
| *H04B 10/071* | (2013.01) | |
| *H04B 1/59* | (2006.01) | |
| *H04L 7/00* | (2006.01) | |
| *H04B 10/25* | (2013.01) | |
| *H04B 10/29* | (2013.01) | |

(52) U.S. Cl.
CPC ........... *H04B 10/0771* (2013.01); *H04B 1/59* (2013.01); *H04B 10/071* (2013.01); *H04B 10/25* (2013.01); *H04L 7/0075* (2013.01); *H04B 10/29* (2013.01)

(58) Field of Classification Search
CPC ................ H04B 10/771; H04B 10/791; H04B 10/0771; H04B 10/0791
See application file for complete search history.

(56) References Cited

U.S. PATENT DOCUMENTS

| 7,406,260 B2 | 7/2008 | MacDonald |
| 7,894,721 B2 * | 2/2011 | Roberts ............... H04J 14/0227 398/38 |
| 9,178,755 B2 | 11/2015 | Dahlfort et al. |
| 9,680,567 B2 | 6/2017 | Swanson et al. |
| 9,806,801 B2 | 10/2017 | Maniloff |

(Continued)

OTHER PUBLICATIONS

Lemaire, V. et al. "Proactive Fiber Break Detection based on Quatemion Time Series and Automatic Variable Selection from Relational Data." Sep. 2019. 16 pages.

(Continued)

*Primary Examiner* — Shi K Li
(74) *Attorney, Agent, or Firm* — Lerner, David, Littenberg, Krumholz & Mentlik, LLP

(57) ABSTRACT

A system is provided along a route of a network including a first transponder at a first node and a second transponder at a second node. The system further includes one or more processors configured to detect, in a first waveform measured at the first transponder, a first signature at a first time point, and configured to detect, in a second waveform measured at the second transponder, a second signature at a second time point. The one or more processors may correlate the first waveform and the second waveform, and determine, based on the correlation, that the first signature and the second signature correspond to a same event occurring along the route of the network. Based on comparing the first time point and the second time point, the one or more processors may determine an estimated location of the event.

20 Claims, 11 Drawing Sheets

(56) References Cited

U.S. PATENT DOCUMENTS

| | | |
|---|---|---|
| 10,348,554 B2 | 7/2019 | Jin |
| 2005/0201761 A1 | 9/2005 | Bartur et al. |
| 2007/0253662 A1* | 11/2007 | Patel .................... G08B 13/184 385/13 |
| 2012/0224846 A1* | 9/2012 | Swanson ................ H04B 10/85 398/13 |
| 2015/0333824 A1* | 11/2015 | Swinkels ............ H04J 14/0227 398/25 |
| 2017/0279524 A1 | 9/2017 | Swanson et al. |
| 2018/0109313 A1 | 4/2018 | Fargano et al. |
| 2019/0260468 A1* | 8/2019 | Xu .................... H04B 10/0771 |

OTHER PUBLICATIONS

Stanic, Stava et al. "Active Monitoring and Alarm Management for Fault Localization in Transparent All-Optical Networks." Jun. 2010. IEEE Transactions on Network and Service Management. vol. 7(2). pp. 118-131.
Partial European Search Report for European Patent Application No. 20207350.8 dated May 6, 2021. 20 pages.

* cited by examiner

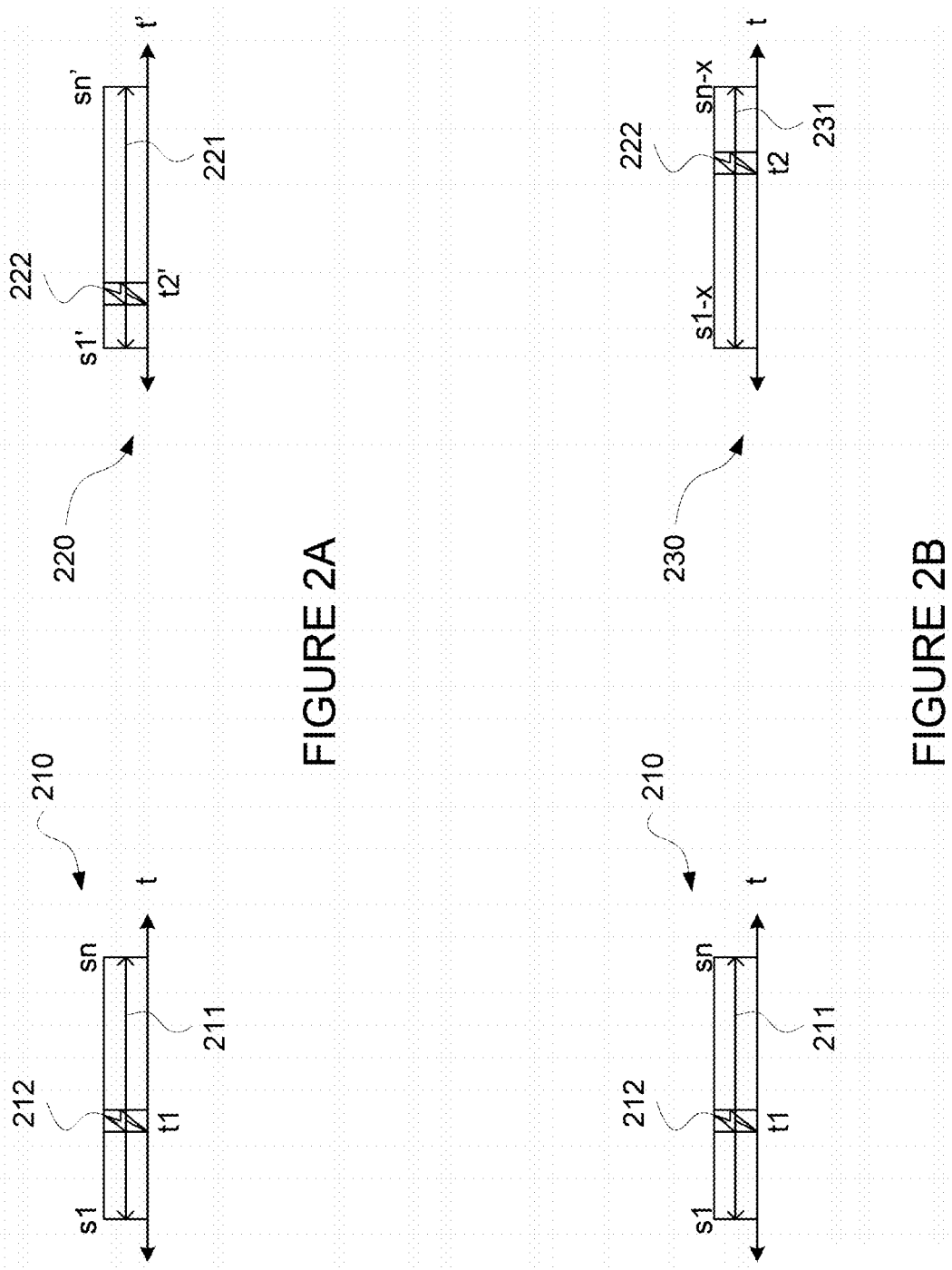

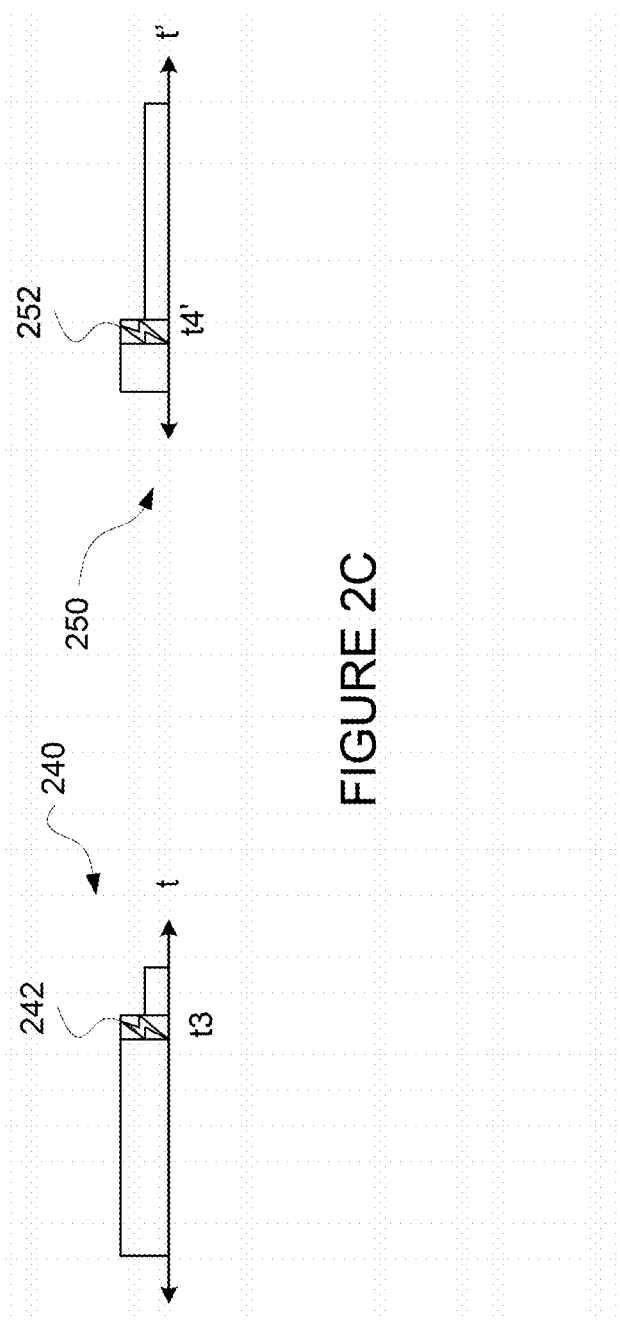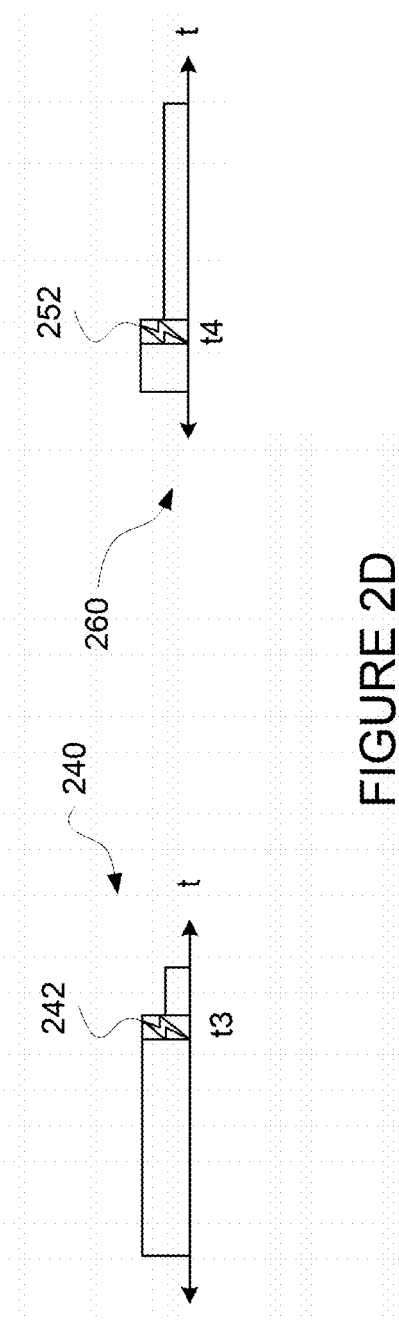

TRANSPONDER BASED ACTIVE MONITORING OF OPTICAL NETWORKS

BACKGROUND

Managing an optical transport network spreading across states, countries, or globally is challenging. Disruptions to the networks are usually detected via alarms from various devices supporting the network, such as repeaters, transponders, and optical nodes. While a variety of permanent disruptive events and faults, such as fiber cuts, may be identified using these alarms, high precision localization remains challenging. Precise localization is even more challenging for temporary events, such as power, loss, polarization, or phase transients.

For instance, an optical route may include multiple routes of optical fibers connected via optical repeaters. One traditional method of monitoring and metrology is an Optical Supervisory Channel (OSC), where an out-of-band, low-speed signal is added and terminated at each repeater to monitor each route of the network. OSC may identify a disruptive event in a route of the network, but the route itself may be tens or hundreds of kilometers long, leaving network operators with a large uncertainty. Further, OSC only detects power transients, and cannot detect other effects that may be indicative of a disruption, such as polarization transients. OSC may track power fluctuation with response times in the order of seconds, which may theoretically be improved to the millisecond range. To localize faults within a route, Optical Time Domain Reflectometers (OTDR) may be used, which send an optical pulse and monitor the reflected light. However, measurement and reaction time for OTDR may be slow, particularly because OTDR is typically triggered after the fact of the disruptive event. Further, OTDR measurements are typically made on the order of seconds or tens of seconds. OTDR is thus suitable for detecting permanent damage such as a fiber cut, but is too slow for detecting temporary power, polarization, and phase transients.

BRIEF SUMMARY

One aspect of the technology provides a system comprising a first transponder at a first node along a route of a network, a second transponder at a second node along the route of the network, and one or more processors. The one or more processors are configured to detect, in a first waveform measured at the first transponder, a first signature at a first time point; detect, in a second waveform measured at the second transponder, a second signature at a second time point; correlate the first waveform and the second waveform; determine, based on the correlation, that the first signature and the second signature correspond to a same event occurring along the route of the network; and determine, based on comparing the first time point and the second time point, an estimated location of the event occurring along the route of the network.

The one or more processors may be further configured to determine, based on at least one of the first signature or the second signature, that a type of the event is at least one of: a change in state of polarization, polarization mode dispersion, variation in birefringence, change in optical power, or change in carrier phase.

The one or more processors may be further configured to determine, based on at least one of the first signature or the second signature, that a type of the event is at least one of: movements, vibrations, or mechanical stress on an optical fiber in the route of the network.

The one or more processors may be further configured to determine a type of the event based on at least one of the first signature or the second signature using one or more trained machine learning models.

The one or more processors may be further configured to synchronize timestamps received for the first waveform with timestamps received for the second waveform to a common time base.

The first waveform and the second waveform may be measured from light signals carrying payload data.

The system may further comprise a third transponder at a third node along the route of the network and a fourth transponder at the second node, wherein the third transponder and the fourth transponder are configured to form a pair of communication links that are separate from a pair of communication links between the first transponder and the second transponder, and wherein the one or more processors are further configured to detect, in a third waveform measured at the third transponder, a third signature at a third time point; detect, in a fourth waveform measured at the fourth transponder, a fourth signature at a fourth time point; correlate the third waveform with the fourth waveform, and at least one of the third waveform or the fourth waveform with at least one of the first waveform or the second waveform; determine, based on the correlations, that the third signature and the fourth signature correspond to the same event occurring along the route of the network; determine, based on comparing the first time point with the second time point, a first estimated location of the event along the route in the network; determine, based on comparing the third time point with the fourth time point, a second estimated location of the event along the route in the network; determine the estimated location further based on the first estimated location and the second estimated location. The one or more processors may be further configured to synchronize timestamps received for the third waveform and timestamps received for the fourth waveform to a common time base as timestamps received for the first waveform or a common time base as timestamps received for the second waveform.

The system may further comprise a third transponder at the first node of the network and a fourth transponder at the second node of the network, wherein the third transponder and the fourth transponder are configured to transmit light of a second wavelength different from a first wavelength that the first transponder and the second transponder are configured to transmit, and the one or more processors are further configured to detect, in a third waveform measured at the third transponder, a third signature at a third time point; detect, in a fourth waveform measured at the fourth transponder, a fourth signature at a fourth time point; correlate the third waveform with the fourth waveform, and at least one of the third waveform or the fourth waveform with at least one of the first waveform or the second waveform; determine, based on the correlations, that the third signature and the fourth signature correspond to the same event occurring along the route of the network; determine, based on comparing the third time point with the first time point and based on propagation speed difference between the first wavelength and the second wavelength, a first estimated location of the event along the route in the network; determine, based on comparing the fourth time point with the second time point and based on the propagation speed difference between the first wavelength and the second wavelength, a second estimated location of the event along the route in the network; determine the estimated location further based on the first estimated location and the second estimated location.

The one or more processors may include a global controller and one or more DSPs located at the first node and the second node.

Another aspect of the technology provides a system including a first transponder at a first node along a route of a network, the first transponder is configured with a loopback configuration at a second node along the route of the network; and one or more processors configured to detect, in a first waveform measured at the first transponder, a first signature at a first time point; detect, in a second waveform measured at the first transponder, a second signature at a second time point; correlate the first waveform and the second waveform; determine, based on the correlation, that the first signature and the second signature correspond to a same event occurring along the route in the network; and determine, based on comparing the first time point and the second time point, an estimated location of the event occurring along the route of the network.

The first signature may be measured in a first frame of light signals, and the second signature may be measured in a second frame after the first light signals have traversed through the route twice.

The first signature and the second signature may be measured in a frame of light signals that encompasses the route twice.

The one or more processors may be further configured to determine, based on at least one of the first signature or the second signature, that a type of the event is at least one of: movements, vibrations, or mechanical stress on an optical fiber in the route of the network.

The one or more processors may be further configured to determine a type of the event based on at least one of the first signature or the second signature using one or more trained machine learning models.

Still another aspect of the technology provides for a method comprising detecting, by the one or more processors in a first waveform measured at a first transponder at a first node along a route of a network, a first signature at a first time point; detecting, by the one or more processors in a second waveform measured at a second transponder at a second node along the route of the network, a second signature at a second time point; correlating, by the one or more processors, the first waveform and the second waveform; determining, by the one or more processors based on the correlation, that the first signature and the second signature correspond to a same event occurring along the route in the network; and determining, by the one or more processors based on comparing the first time point and the second time point, an estimated location of the event occurring along the route in the network.

The method may further comprise determining, by the one or more processors based on at least one of the first signature or the second signature, that a type of the event is at least one of: a change in state of polarization, polarization mode dispersion, variation in birefringence, change in optical power, or change in carrier phase.

The method may further comprise determining, by the one or more processors based on at least one of the first signature or the second signature, that a type of the event is at least one of: movements, vibrations, or mechanical stress on an optical fiber in the route of the network.

The method may further comprise detecting, by the one or more processors, in a third waveform measured at a third transponder via a first communication link between the third transponder and a fourth transponder at the second node, a third signature at a third time point; detecting, by the one or more processors in a fourth waveform measured at the fourth transponder via a second communication link between the third transponder and the second transponder, a fourth signature at a fourth time point; correlating, by the one or more processors, the third waveform with the fourth waveform, and at least one of the third waveform or the fourth waveform with at least one of the first waveform or the second waveform; determining, by the one or more processors based on the correlations, that the third signature and the fourth signature correspond to the same event occurring along the route of the network; determining, by the one or more processors based on comparing the first time point with the second time point, a first estimated location of the event along the route in the network; determining, by the one or more processors based on comparing the third time point with the fourth time point, a second estimated location of the event along the route in the network; determining, by the one or more processors, the estimated location further based on the first estimated location and the second estimated location.

The method may further comprise detecting, by the one or more processors, in a third waveform measured from a third transponder, a third signature at a third time point, the third waveform and having a second wavelength that is different from a first wavelength of the first waveform and the second waveform; detecting, by the one or more processors in a fourth waveform measured from a fourth transponder, a fourth signature at a fourth time point, the fourth waveform having the second wavelength; correlating, by the one or more processors, the third waveform with the fourth waveform, and at least one of the third waveform or the fourth waveform with at least one of the first waveform or the second waveform; determining, by the one or more processors based on the correlations, that the third signature and the fourth signature correspond to the same event occurring along the route of the network; determining, by the one or more processors based on comparing the third time point with the first time point and based on propagation speed difference between the first wavelength and the second wavelength, a first estimated location of the event along the route in the network; determining, by the one or more processors based on comparing the fourth time point with the second time point and based on propagation speed difference between the first wavelength and the second wavelength, a second estimated location of the event along the route in the network; determining, by the one or more processors, the estimated location further based on the first estimated location and the second estimated location.

BRIEF DESCRIPTION OF THE DRAWINGS

FIGS. 2A and 2B illustrate example detection and localization of an event occurring in the route of FIG. 1.

FIGS. 2C and 2D illustrate example detection and localization of another event occurring in the route of FIG. 1.

DETAILED DESCRIPTION

Figure 1:
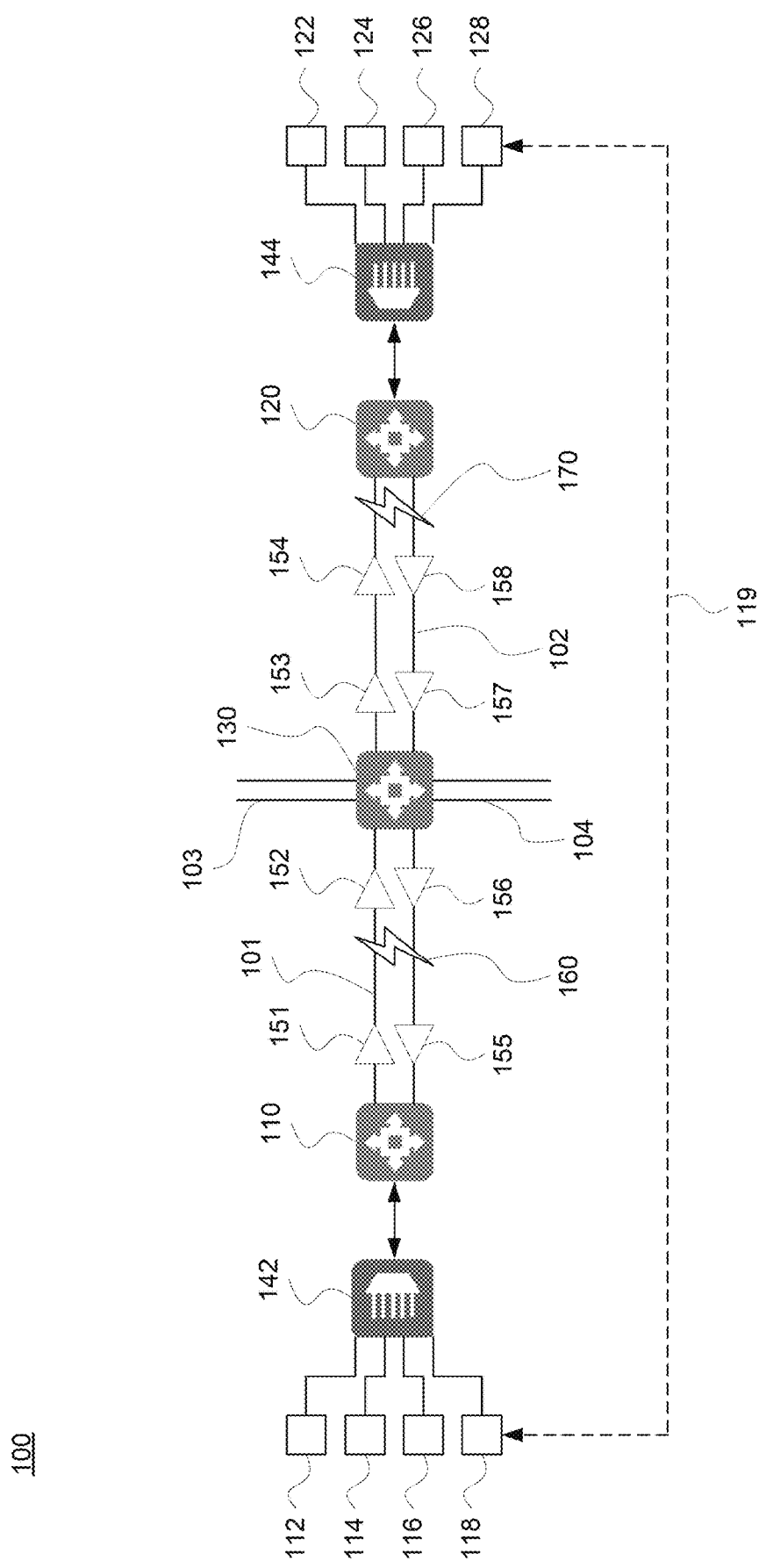
FIG. 1 shows an example route in an optical network in accordance with aspects of the disclosure.

The technology relates generally to systems and methods for monitoring optical networks using optical transponders. For instance, along a route of a network, a first transponder may be provided at a first node and a second transponder may be provided at a second node. The first transponder and second transponder may form communication links for transmitting payload data between each other. The network may include one or more processors, such as digital signal processors (DSPs) that are part of transponders, global controllers such as software defined networking controllers (SDN) controller, etc. The one or more processors may detect, in a first waveform measured at the first transponder, a first signature at a first time point and, in a second waveform measured at the second transponder, a second signature at a second time point. By correlating the first waveform and the second waveform, the one or more processors may determine that the first signature and the second signature corresponds to a same event occurring along the route of the network. Based on comparing the first time point and the second time point, the one or more processors may determine an estimated location of the event along the route.

In some instances, additional transponders along the route may further be configured to output signals including waveforms, which may be analyzed by the one or more processors to localize the event. For example, one or more additional transponders may be provided at a third node in the route of the network, thus allowing triangulation to be performed in the localization of the event along the route. As another example, one or more additional pairs of transponders may be provided at the first node and the second node, and configured to transmit light of a different wavelength as the wavelength used by the first and second transponder, thus allowing dispersion effects to be leveraged in the localization of the event along the route.

In other instances, instead of using transponders that carry payload data, one or more dedicated transponders may be used for event detection and localization. For example, one dedicated transponder may be provided at the first node in the route, with its signals looped back to itself from the second node in the route. Due to the loop-back configuration, an event occurring between the first node and the second node may be detected by the dedicated transponder twice. As such, the event may be localized by the one or more processors based on comparing the difference in detection times at the dedicated transponder.

The technology is advantageous because event detection and localization may be performed at a high speed using high speed components such as transponders and DSPs, which allows for detection of fast transients even while they are occurring. For example, the high speed components may allow detection of transients on the order of nanoseconds, such as ~100 ns. In instances where transponders carrying payload data are further used to generate waveforms for event detection and localization, achievable capacity of the network is not impacted. Where multiple transponders at different nodes are used for event localization, accuracy of localization may be improved by using triangulation and dispersion effects. In other instances, accuracy in localization may be improved and the need for synchronization may be eliminated by using one or more dedicated transponders that do not carry payload data.

FIG. 1 shows an example route 100 in an optical network in accordance with aspects of the disclosure. The route 100 includes node 110, node 120, and node 130, connected through one or more optical fibers. For example, a first optical fiber 101 may transmit light in a first direction from node 110 to node 130 to node 120, and a second optical fiber 102 may transmit light in a second direction from node 120 to node 130 to node 110. The optical fibers 101 and 102 may be placed in close proximity to each other, for example, optical fibers 101 and 102 may be part of one cable assembly. The route 100 may be tens or hundreds of kilometers long, and may include many curves, bends, elevation changes, etc., as opposed to the linear shape shown here for ease of illustration. The route 100 may be connected to one or more other routes in the network, as illustrated via optical fibers 103 and 104 from node 130.

A node may be configured to optically route optical signals to other nodes in the network. For instance, node 110 and node 120 are configured to route optical signals via optical fibers to other nodes, including to each other via node 130. Node 130 is configured to route optical signals to both node 110 and node 120, as well as additional nodes not shown in FIG. 1, for example via optical fibers 103 and 104. Although only a few nodes and optical fibers are shown in FIG. 1, it should be understood that in practical systems a route of an optical network may include many nodes and many optical fibers.

A node may additionally be configured to convert the optical signals into electrical signals for transmission to local routers or switches ("terminate" or "drop"), and generate optical signals based on electrical signals from local routers or switches for optical transmission ("add"). For instance, optical signals may be received by transponders 112-118 of node 110, and the optical signals may be terminated and converted into electrical signals for transmission to local routers. Electrical signals, such as those from local routers, may be converted into optical signals, and transmitted by the transponders 112-118 of node 110 to other nodes. In contrast, in this example node 130 is not configured to terminate optical signals for transmission to local routers or generate optical signals from electrical signals. Although in other examples node 130 may also be configured with add/drop capabilities.

Further as shown, add/drop structures including multiplexers and/or demultiplexers may be provided for terminating optical signals, and/or for generating optical signals from electrical signals. For example, add/drop structure 142 may be provided at node 110 coupled to the transponders 112-118, and add/drop structure 144 may be provided at node 120 coupled to the transponders 122-128. The route 100 may also include amplifiers to ensure optical signal intensity along the route 100. Thus as shown, amplifiers 151, 152, 153, 154 may be provided along the first fiber 101 to amplify the light transmitted in the first direction, while amplifiers 155, 156, 157, 158 may be provided along the second fiber 102 to amplify the light transmitted in the second direction.

Each transponder may include a transmitter and a receiver (not shown) for transmitting and receiving light signals, respectively. To enable communication between two nodes, one or more transponders from one node may be paired with one or more transponders from another node. Thus as shown by the dashed line, transponder 118 of node 110 is paired with transponder 128 of node 120, forming a pair of communication links 119. For example, the transmitter of transponder 118 may be coupled with the receiver of transponder 128, forming one of the communication links 119, and the transmitter of transponder 128 may be coupled with the receiver of transponder 118, forming the other of the communication links 119.

Communication between nodes may be performed by modulation of the light signals. Thus, a transmitter system at one node may modulate a carrier light signal to encode data, and a receiver system at another node may detect and decode the modulated light signal to recover the data. For instance, amplitude, phase, intensity, and/or other characteristics of a carrier light signal may be modulated to encode the data. In that regard, though not shown in FIG. 1, each node may include one or more processors, for example each transponder may include a digital signal processor (DSP) for encoding and decoding data, as well as digital to analog converters, analog to digital converters, hybrids, beam splitters, amplifiers, photodetectors, and/or other optical or electrical components for encoding and decoding the data. Further, since the properties of a light signal can randomly change during transmission, the receiver system needs to perform recovery of these properties once the light signal is received. In that regard, each node may further include a local oscillator (LO), and interference may be performed between the received light signals and the LO to recover the properties of the carrier light signal.

External effects, such as cuts or pinches on the optical fiber, and other movements in the optical fiber's environment, such as movement of people and vehicles, collisions, earthquakes, etc., may cause changes to the characteristics of the light signals that are different from random variations under normal circumstances. For instance, movement or vibration may cause rotation in the polarization of optical fields, resulting in random changes in state of polarization (SOP). Movement, vibration or other forms of mechanical stress, temperature variations may also induce birefringence which causes two different polarizations of light that are normally transmitted at the same speed through an optical fiber to be transmitted at different speeds, resulting in polarization mode dispersion (PMD). Mechanical stress on the optical fiber may introduce birefringence variations in the fiber, which may also result in polarization rotations of the optical fields. As another example, external effects, such as mechanical vibrations, may change an optical length of the optical fiber, resulting in change in carrier phase of the light signals. As still another example, optical power of the light signal may change due to these external effects.

Of these external effects, some may be benign (such as normal traffic of people and vehicles), some may be disruptive but transient (such as a pinch on the optical fiber), and some may cause permanent damage (such as a cut in the fiber). Changes to the light signals as a result of these external effects may manifest as signatures in the resulting waveforms. These signatures may be classified, for example as to whether they correspond to external effects that are disruptive. Alternatively or additionally, the signatures may be further classified as to the type of disruptive event.

For instance, one or more models, such as machine learning models, may be trained to recognize signatures in waveforms that correspond to disruptive events. The models may be trained in a supervised or semi-supervised manner. In this regard, waveforms that are known to have resulted from disruptive events as well as waveforms that are known not to have resulted from disruptive events may be used as training inputs, and labeling of whether each waveform corresponds to a disruptive event may be used as training outputs. Thus, the model is trained to recognize patterns or signatures in the waveforms that are indicative of disruptive events.

In some instances, the model may be further trained to classify the type of disruptive events based on the signatures in the waveforms. In this regard, waveforms with signatures corresponding to known types of disruptive events may be used as training inputs, and labeling of the types of known disruptive events may be used as training outputs. Thus, the model is trained to recognize patterns in the signatures that distinguish the different types of disruptive events.

The model may be any type of machine-trainable model. As some examples, the model may be a regression model such as a linear regression model, a neural network model, a random forest model, a decision tree model, etc. In some instances, the waveforms may be prepared as training data before being used to train a model, such as filtering to remove random noise.

Additionally or alternatively, signatures in the waveforms may be identified as indicative of disruptive events based on deterministic factors. For instance, experiments may be performed where various external effects may be applied on an optical fiber, and the resulting waveforms may be analyzed. Based on the analyses, signatures with particular thresholds, ranges, parameters, functions, heuristics, etc., may be identified as corresponding to one or more disruptive events.

To enable detection and localization of disruptive events along the route 100, light signals received by the one or more transponders may be analyzed. For instance, one or more processors may be configured to analyze the waveforms of the light signals received using trained models or deterministic factors as described above. In the example shown in FIG. 1, while transponders 118 and 128 are carrying light signals that include payload data, one or more processors may be configured to analyze the light signals received at the respective transponder. For instance, when an event, such as event 160 or event 170 shown, occurs along the route 100, the light signals received at both the transponder 118 and the transponder 128 may have waveforms that capture the event. This may be due to the fact the fiber 101 and fiber 102 are placed in close proximity with each other such that an event along the route 100 would affect both fibers. This is particularly the case when fiber 101 and fiber 102 are part of one cable assembly. For example, the event 160 may be a polarization transient such as a change in SOP or PMD, or may be a phase transient due to a change in optical length. As another example, the event 170 may be a power transient, such as a reduced light intensity or power due to a pinch on the optical fibers 101 and 102.

FIGS. 2A and 2B illustrate detection and localization of the event 160. As shown, since the event 160 is occurring closer to the first node 110 than the second node 120, the event 160 may first be captured in a first waveform 210 detected at node 110, for example by transponder 118. Transponder 118 may include one or more processors for analyzing the first waveform 118, such as a DSP (not shown in FIG. 1, may be configured as item 910 of FIG. 9). The first waveform 210, being processed by the DSP of transponder 118 at node 110, may have a first time base t. The DSP of transponder 118 may analyze the first waveform 210, and detect a first signature 212 in the first waveform 210. Further, the DSP of transponder 118 may determine whether the first signature 212 is indicative of a disruptive event. Alternatively or additionally, the DSP of transponder 118 may further classify a type of the disruptive event based on the first signature 212. The DSP of transponder 118 may make these determinations using one or more trained models as described above, for example by using the first waveform 210 and/or the first signature 212 as inputs to the trained model, and receive as outputs from the trained model classifications of the event 160 as disruptive or not, and if so, a type of the disruptive event. Additionally or alternatively, the DSP of transponder 118 may make these determinations by comparing the first signature 210 to predetermined thresholds, ranges, and/or parameters, as described above.

Figure 9:
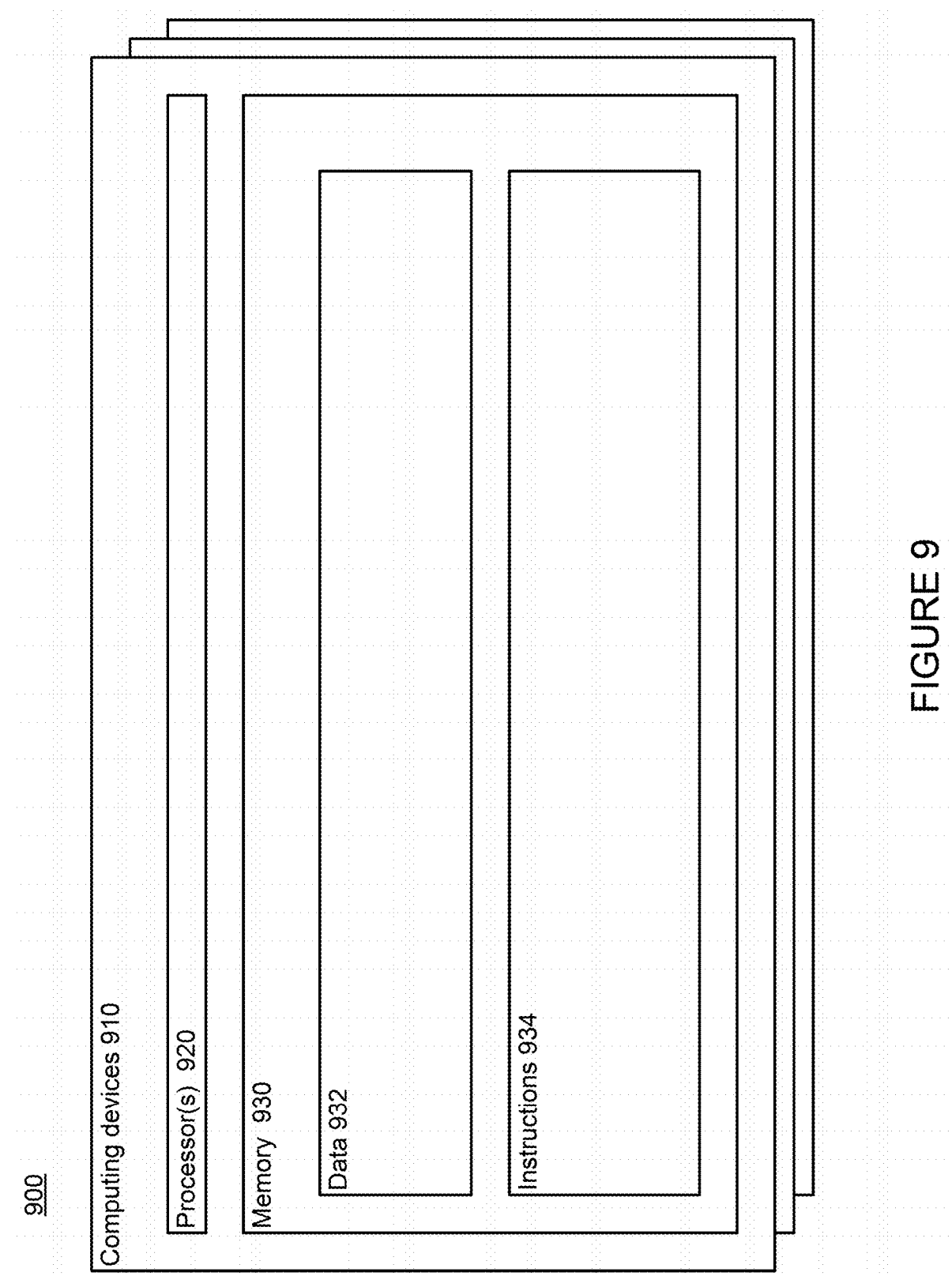
FIG. 9 is a block diagram of an example system in accordance with aspects of the disclosure.

Upon detecting a disruptive event based on the first waveform 210, the DSP of transponder 118 at node 110 may send the first waveform 210 to a global controller (not shown in FIG. 1, may be configured as item 910 of FIG. 9). For example, the global controller may be a Software Defined Networking controller (SDN). The global controller may be located at one of the nodes in the network, such as node 110 or node 120, or some other location. The global controller may receive waveforms and/or signatures determined to be indicative of disruptive events by local DSPs from different transponders at different nodes of a network, or from nodes within particular route(s) of a network, and correlate them to localize the disruptive events. Alternatively, all waveforms may be sent to the global controller to be analyzed for disruptive events and/or classification, for example using trained models or deterministic factors as described above, instead of at the local DSPs.

At a later time, this event 160 may be captured in a second waveform 220 detected at node 120, for example by transponder 128. The transponder 128 may include one or more processors for analyzing the second waveform 220, such as a DSP (not shown in FIG. 1, may be configured as item 910 of FIG. 9). The DSP of the transponder 128 may process the second waveform 220 with a second time base t', which may be different from the first time base of the DSP of transponder 118 at node 110, hence the difference in time between the two detection times shown in FIG. 2A may not reflect actual difference in detection times. The DSP of transponder 128 may analyze the second waveform 220, and detect a second signature 222 in the second waveform 220. Further, the DSP of transponder 128 may determine whether the second signature 222 is indicative of a disruptive event. Alternatively or additionally, the DSP of transponder 128 may further classify a type of disruptive event based on the second signature 222. The DSP of transponder 128 may make these determinations using one or more trained models as described above, or based on comparison to predetermined thresholds, ranges, and/or parameters.

Upon detecting a disruptive event based on the second waveform 220, the DSP of transponder 128 may send the second waveform 220 to the global controller where the first waveform 210 is also sent. To localize the event 160, the global controller may analyze waveforms from both the first node 110 and the second node 120 for signatures that correspond to the same event 160. For instance, the global controller may compare the first waveform 210 with the second waveform 220. As an example, one or more correlations may be performed between the first waveform 210 and the second waveform 220. The global controller may determine, based on the one or more correlations, that the first signature 212 and the second signature 222 correspond to the same event 160. Alternatively or additionally, the global controller may compare the first signature 212 and the second signature 222 against the same set of thresholds, ranges, parameters, etc., to determine whether they correspond to the same event 160. In this regard, the global controller may determine that the first signature 212 and the second signature 222 correspond to the same event 160 if certain parameters or values are within one or more predetermined thresholds.

As mentioned above, because node 110 and node 120 are positioned at different locations along the route 100 as shown in FIG. 1, event 160 may be detected at different time points by the node 110 and the node 120. Thus, while the first signature 212 corresponding to event 160 is detected at time point t1 by the first node 110, the second signature 220 corresponding to the same event 160 is detected at time t2' by the second node 120. Assuming perfect synchronization in the timestamps, which is the case where the time bases t and t' of the two nodes are synchronized, if the distance of the route 100 between the first node 110 and the second node 120 is known, and a speed of light propagation in the optical fiber is known, then the location of the event 160 along the route 100 may be determined by the global controller based on the difference in the times of detection. For example, if the total distance of the route 100 is d=800 km, and light propagation speed in the optical fiber is v=2*10^8 m/s, and the event 160 is detected at t1 and t2', then t1=d_event/v, and t2'=(d−d_event)/v, where d_event is the location of the event 160 as measured from node 110. Thus, d_event may be solved by combining the two equations, resulting in d_event=[(t2'−t1)*v+d]/2. Accordingly, if the difference between t2' and t1 is known, for example 1 µs, then d_event=(1 µs*2×10^8 m/s+800 km)/2=500 km.

However, in practical situations as illustrated by FIG. 2A, node 110 and node 120 may generate timestamps with different time bases, such as time bases t and t' shown. For instance, signals received at node 110 may be divided into frames, where each frame includes signals transmitted in an amount of time it takes for light to traverse an entire length of the route 100. Thus as shown in FIG. 2A, the frame 211 begins with a first signal s1 and ends with a last signal sn. In other words, when the first signal s1 of the frame is received by node 110, the last signal sn of the frame is at node 120. Signals received at node 120 may likewise be divided into frames, where each frame includes signals transmitted in an amount of time it takes for light to traverse an entire length of the route 100. For instance, the frame 221 begins with a first signal s1' and ends with a last signal sn' such that, when the first signal s1' of the frame 221 is received by node 120, the last signal sn' of the frame is at node 110.

Node 110 and node 120 may each respectively generate timestamps corresponding to the signals in the frames 211 and 221. However, because the first signal s1 in frame 211 may not start at the same time as the first signal s1' of frame 221, node 110 and node 120 may generate timestamps that do not have the same starting point. This means that t1 and t2' are not measured with reference from the same starting time point. Further, a clock generating timestamps at node 110 may not be synchronized with a clock generating timestamps at node 120, which may result in further discrepancies. Thus as shown in FIG. 2A, even though the event 160 was detected by node 110 before node 120, t1 appears later in the frame 211 than t2' in the frame 221 due to the difference in time bases.

To use the difference in detection times to localize the event 160, the two nodes 110 and 120 may need to be synchronized such that timestamps are corrected to the same time base. Any appropriate synchronization and/or correction method may be used, and may be performed by the global controller. For example, transponder 118 may send a signal known to transponder 128 at timestamp t_send which is generated in the time base t of the first node 110. This known signal may be detected by transponder 128 at timestamp t_received', which is generated in the time base t' of the second node 120. As such, the relationship t_received'=t_send+t_d+ε may be used to determine the correction factor, where t_d is the time it takes the light signal to traverse the entire length d of the route 100, and ε is the correction factor. The waveforms may then be synchronized using the correction factor ε.

FIG. 2B shows the synchronized waveforms. As shown, the frames and the waveforms are synchronized to the time base t of the first node 110. Thus, where the timestamps for the waveform 210 are unchanged, the timestamps for the waveform 220 are corrected by the global controller to the time base t of the first node 110, resulting in waveform 230 and a shifted frame 231 that aligns in time with the frame 211. As such, the second signature 222 resulting from detection of the event 160 by node 120 may have a corrected timestamp of t2=t2'-ε. As shown, after synchronized to the same time base, FIG. 2B shows that the event 160 is detected first by the node 110, then by the node 120. Alternatively, the frames and the waveforms may be synchronized to the time base t' of the second node 120.

Once synchronized, an estimated location of the event 160 along the route 100 may be determined by the global controller using the relationship d_event=[(t2−t1)*v+d]/2. Thus, the accuracy of the localization depend on the degree of synchronization between the nodes. The accuracy of the localization may further depend on the speed or symbol rate of the transponders, where slow transponders may not be able to capture small differences in distance. For example, if a transponder sends signals that are more than 1 us apart, the transponder cannot be used for detecting difference in distance less than 1 μs*speed of light propagation.

As an alternative or in addition to having the global controller performing the event localization, waveforms determined by respective local DSPs of different transponders at different nodes to be indicative of disruptive events may be sent to a DSP at one of the transponders that detected the event for localization analysis. For example, both the first waveform 210 and the second waveform 220 may be sent to either the DSP of transponder 118 at node 110 or the DSP of transponder 128 at node 120 for localization analysis. In this regard, the DSP that received both the first waveform 210 and the second waveform 220 may perform the localization analyses described above for the global controller, which may include correlation, synchronization, computing distances based on detection time differences, etc.

Once a disruptive event is detected and localized, information on the disruptive event may be outputted. For example, the global controller or the DSP that performed the detection and localization may generate output on the detected disruptive event. The output may include information such as type of event, time of event, estimated location of the event, suggestions on handling the event, etc. The output may be in any format, such as texts, messages, alerts, logs, and may include graphics, sounds, haptics, etc. In this regard, the global controller or the DSP may be in communication with one or more output devices, such as a display, speakers, touch screen, etc., and/or may be in communication with other computing devices that include output devices, such as computing devices of a network operator.

FIGS. 2C and 2D illustrate detection and localization of the event 170, which show many similar features as FIGS. 2A and 2B. As described above, the global controller (or DSP of transponder 118 or 128n that received both waveforms) may compare or correlate a first waveform 240 detected at node 110 and a second waveform 250 detected at node 120 to determine that first and second signatures 242 and 252 both correspond to the event 170. Referring to FIG. 2C, since event 170 is a power transient, the resulting first and second waveforms 240 and 250 show reductions in intensity. FIG. 2C further shows that the first signature 242 resulting from the event 170 is detected by the first node 110 at timestamp t3, which is in time base t of the first node 110, while second signature 252 resulting from the event 170 is detected by the second node 120 at timestamp t4', which is in time base t' of the second node 120. As such, synchronization may be performed by the global controller (or DSP of transponder 118 or 128 that received both waveforms) as described with reference to FIGS. 2A and 2B. FIG. 2D shows the synchronized waveforms. In particular, the second waveform 250 is corrected to the time base t of the first node 110, resulting in waveform 260. Signature 252 is then provided with corrected timestamp t4 in the time base t. Based on the synchronized timestamps, an estimated location of the event 170 along the route 100 may be determined by the global controller (or DSP of transponder 118 or 128 that received both waveforms) as described above with reference to FIG. 2B, for instance using the relationship d_event=[(t3−t4)*v+d]/2.

Returning to FIG. 1, because event detection and localization are performed based on signals from transponders and DSPs, which are high-speed components used for data transmission and encoding/decoding, event detection and localization may be performed at a high speed. This allows transients, such as polarization transients, phase transients, and power transients to be detected at a high speed, even while they are occurring, instead of detection after the fact. Further, because the transponders used to generate the waveforms for event detection and localization are transponders that carry payload data, the configuration of FIG. 1 does not impact the achievable capacity of the route 100. However, as mentioned above, the accuracy of the localization may depend on the accuracy of the synchronization. To improve the accuracy of localization without impacting achievable capacity, transponders in partially different routes of the network may be configured to enable triangulation.

Figure 3:
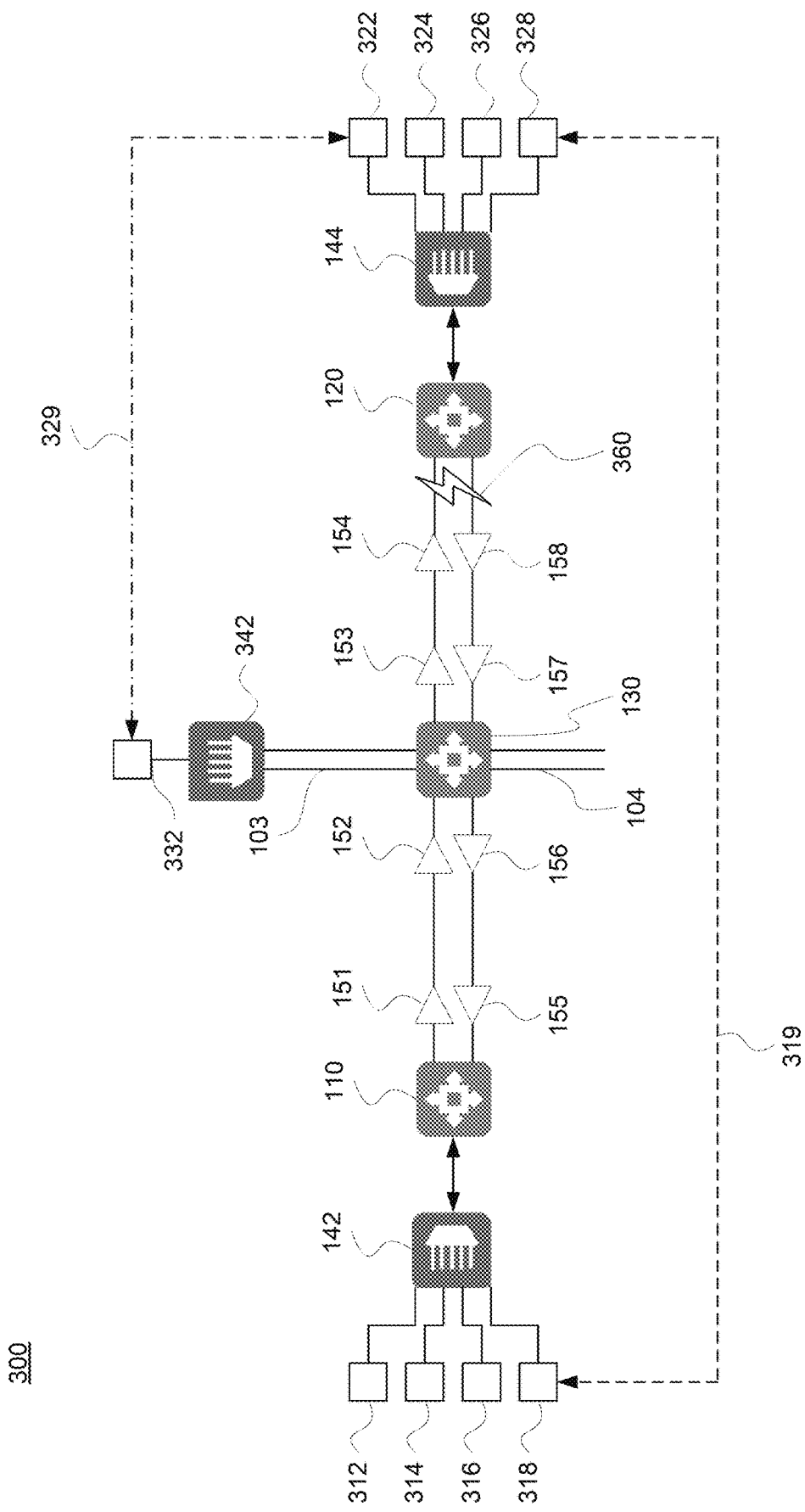
FIG. 3 shows another example route in an optical network in accordance with aspects of the disclosure.

FIG. 3 shows another example route 300 in an optical network in accordance with aspects of the disclosure, which uses triangulation to improve localization accuracy. Route 300 includes many similar features as route 100 of FIG. 1, and are labeled as such. As shown, route 300 may also include nodes 110, 120, and 130, fibers 101 and 102, add/drop structures 142 and 144, and amplifier 151-158.

However, transponders in route 300 are configured differently as the transponders of route 100. For instance, in addition to one or more transponders of node 110 being coupled to the one or more transponders of node 120, one or more transponders of node 130 are also coupled to one or more transponders of node 120. Thus as shown, transponder 318 at node 110 is paired with transponder 328 of node 130, forming a first pair of communication links 319, and transponder 332 of node 130 is paired with transponder 322 of node 120, forming a second pair of communication links 329. Further, one or more processors may be configured to analyze light signals including payload data received at each of transponders 318, 328, 332, and 322 for event detection and localization. As such, the segment between node 130 and node 120 is monitored by two independent light signals.

Due to this redundancy, triangulation may be performed to improve accuracy in localization of events occurring in the route 300 between nodes 130 and 120. For example, for event 360 occurring in the segment between node 130 and node 120, the event 360 may be detected by both transponders 318 and 328 along the first pair of communication links 319, as well as both transponders 312 and 332 along the second pair of communication links 329.

Figure 4A:
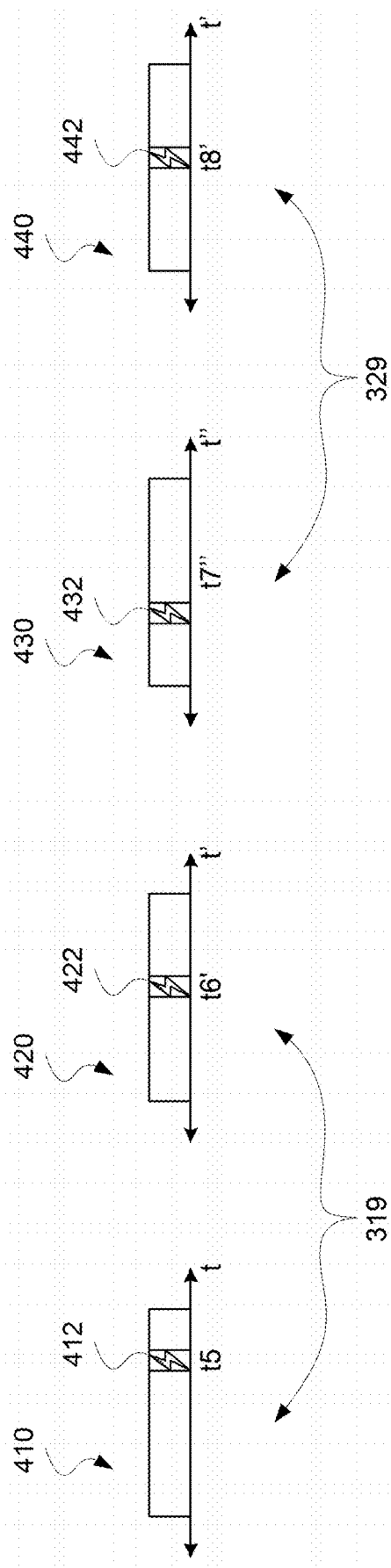
FIGS. 4A and 4B illustrate example detection and localization of an event occurring in the route of FIG. 3.
Figure 4B:
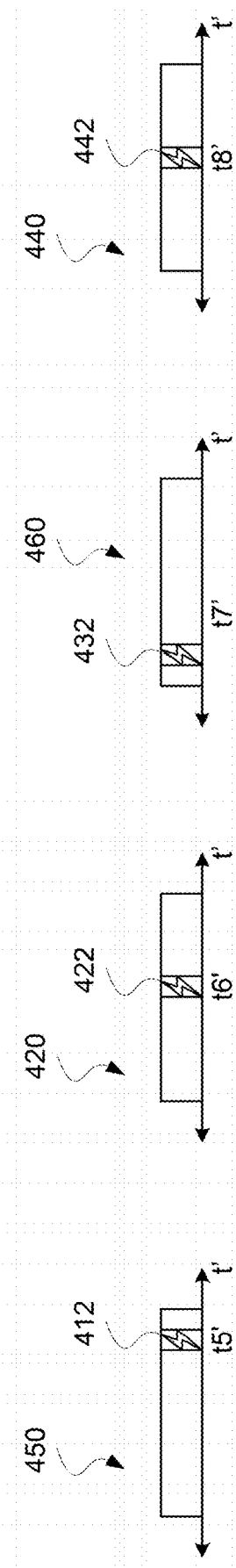

Waveforms resulting from both independent light signals may be analyzed, which is illustrated by FIGS. 4A and 4B. As shown in FIG. 4A, through the first pair of communication links 319, the event 360 may be captured in a first waveform 410 detected by transponder 318 of node 110, and in a second waveform 420 detected by transponder 328 of node 120. Additionally, through the second pair of communication links 329, the event 360 may be captured in a third waveform 430 detected by transponder 332 of node 130, and in a fourth waveform 440 detected by transponder 322 of node 120. Further as shown, each of the waveforms 410-440 include a respective signature 412, 422, 432, and 442 resulting from the event 360. The DSP of each respective transponder 318, 328, 332, 322 may classify each respective waveform 410-440 and/or signature 412-442 as whether indicative of a disruptive event, and optionally a type of disruptive event, for example as described above with reference to FIGS. 1-2B.

If determined to be disruptive, the DSP of each respective transponder 318, 328, 332, 322 may send the waveforms 410-440 and/or signatures 412-442 to the global controller (or a DSP of one of the transponders 318, 328, 332, 322 that received all the waveforms and/or signatures). The global controller (or the DSP that received all the waveforms and/or signatures) may then compare the waveforms 410-440 and/or signatures 412-442. For instance, the global controller (or a DSP that received all the waveforms and/or signatures) may determine that the signatures 412-442 in the waveforms 410-440 correspond to the same event 360 based on comparison and/or correlations, for example as described above with reference to FIGS. 1-2B.

FIG. 4A further shows that the waveforms are not provided with synchronized timestamps. For example, waveform 410 has timestamps in the first time base t, waveforms 420 and 440 have timestamps in the second time base t', and waveform 430 has timestamps in the third time base t''. As such, synchronization between the three time bases may be performed by the global controller (or the DSP that received all the waveforms and/or signature), for example as described above with reference to FIGS. 2A and 2B. In this example, the waveform 410 is converted from the first time base t of the node 110 to the second time base t', and the waveform 430 is converted from the third time base t'' of the node 130 to the second time base t'. Thus as shown in FIG. 4B, the resulting waveforms 450, 420, 460, and 440 are provided with timestamps in a common time base t' of node 120, and the signatures 412, 422, 432, and 442 are provided with timestamps in a common time base t'. In instances where transponders 322 and 328 are not in the same time base, similar synchronization may need to be performed between the transponders 322 and 328.

Once the timestamps are synchronized, event 360 may be localized by the global controller (or the DSP that received all the waveforms and/or signature) based on the synchronized timestamps for the signatures. For instance, based on synchronized timestamps for signatures 412 and 422 detected on the first pair of communication links 319, a first estimated location of the event 360 may be determined with the relationship $d\_event\_1=[(t5'-t6')*v+d]/2$, where v is the speed of light propagation in the optical fiber, and d is the length of the communication links 319 extending the entire route 300. Likewise, based on synchronized timestamps for signatures 432 and 442 detected on the second pair of communication links 329, a second estimated location of the event 360 may be determined with the relationship $d\_event\_2=[(t7'-t8')*v+d2]/2$, where v is the speed of light propagation in the optical fiber, and d2 is the length of the communication links 329 extending between node 130 and node 120.

Based on the first estimated location d_event_1 determined using detections through the first pair of communication links 319, and the second estimated location d_event_2 determined using detections through the second pair of communication links 329, a more precise estimated location of the event 360 may be determined by the global controller (or the DSP that received all the waveforms and/or signature). For instance, if d_event_1 and d_event_2 are not the same, the global controller may determine that event 360 occurred somewhere between d_event_1 and d_event_2, which may reduce the uncertainty in the location of the event 360 to within the range of d_event_1 and d_event_2. On the other hand, if d_event_1 and d_event_2 are the same, the global controller may have greater confidence on the localization of the event 360, which is confirmed by independent localization using two independent light signals.

Although the example of FIG. 3 illustrates triangulation through 2 pairs of transponders located at 3 nodes in a route of a network, any of a number of pairs of transponders may be used. For example, a transponder at another node (not shown) may be paired with transponder 324 of node 120, forming a third communication link pair that includes the segment between node 130 and node 120. Detections based on this third independent light signals may further improve accuracy of localization. As another example, a second transponder at node 130 may be paired with transponder 312 of node 110, which may allow triangulation to be used to localize an event on the segment between node 110 and node 130. In a mesh network with many nodes connected in many directions, pairing of many transponders between multiple nodes with overlapping segments may thus greatly improve localization of events within the network.

Figure 5:
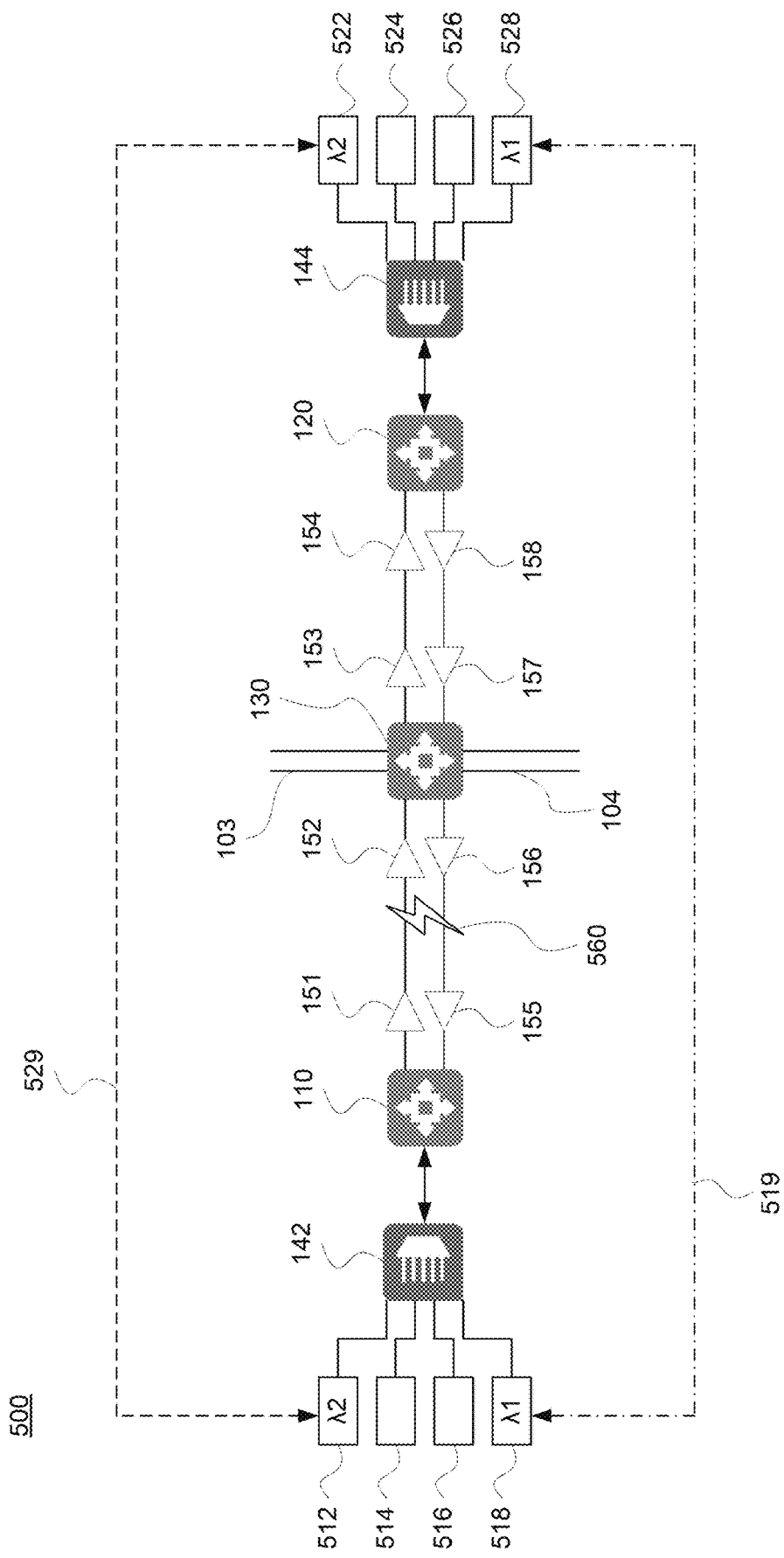
FIG. 5 shows another example route in an optical network in accordance with aspects of the disclosure.

Additionally or alternatively, accuracy in localization may be improved by leveraging dispersion effects. FIG. 5 shows another example route 500 in an optical network in accordance with aspects of the disclosure, which leverages dispersion effects to improve localization accuracy. Route 500 includes many similar features as route 100 of FIG. 1, and are labeled as such. As shown, route 500 may also include nodes 110, 120, and 130, fibers 101 and 102, add/drop structures 142 and 144, and amplifier 151-158.

However, transponders in the route 500 are configured differently as the transponders of route 100. For instance, in addition to using one pair of transponders from node 110 and node 120 for event detection and localization, another pair of transponders from node 110 and node 120 that transmit light having a different wavelength may be used for event detection and localization. Thus as shown, transponder 518 of node 110 is coupled to transponder 528 of node 120, forming a first pair of communication links 519 that transmit light of a first wavelength $\lambda 1$, and transponder 512 of node 110 is coupled to transponder 522 of node 120, forming a second pair of communication links 529 that transmit light of a second wavelength $\lambda 2$. Payload data may be included in light signals of both wavelengths $\lambda 1$ and $\lambda 2$. One or more processors are configured to analyze the light signals received at each of transponders 518, 528, 512, and 522 for event detection and localization. As such, the route 500 is monitored by two independent light signals.

Because light of different wavelengths propagates at different speeds in a dispersive medium, such as an optical fiber, this dispersion effect may be leveraged to improve accuracy in localization of events occurring in the route 500. For example, event 560 occurring in the route 500 may be detected by transponders 518 and 528 with waveforms in the first wavelength, and by transponders 512 and 522 with waveforms in the second wavelength.

Figure 6A:
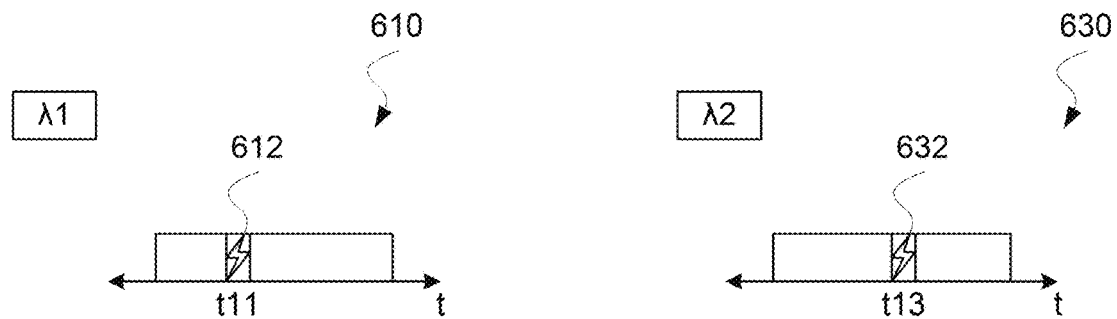
FIGS. 6A and 6B illustrate example detection and localization of an event occurring in the route of FIG. 5.
Figure 6B:
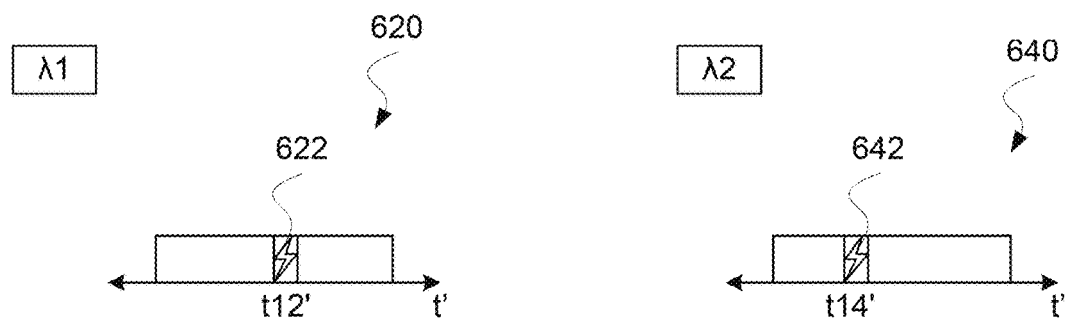

Waveforms resulting from both independent light signals may be analyzed, which is illustrated by FIGS. 6A and 6B. As shown in FIGS. 6A and 6B, through the first pair of communication links 519, the event 560 may be captured in a first waveform 610 detected at transponder 518 of node 110, and in a second waveform 620 detected at transponder 528 of node 120. Additionally, through the second pair of communication links 529, the event 560 may be captured in a third waveform 630 detected at transponder 512 of node 110, and in a fourth waveform 640 detected at transponder 522 of node 120. Further as shown, each of the waveforms 610-640 include a respective signature 612, 622, 632, and 642 resulting from the event 560. The DSP of each respective transponder 518, 512, 528, 522 may classify each respective waveform 610-640 and/or signature 612-642 as whether indicative of a disruptive event, and optionally a type of disruptive event, for example as described above with reference to FIGS. 1-2B.

If determined to be disruptive, the DSP at each respective transponder 518, 512, 528, 522 may send the waveforms 610-640 and/or signatures 612-642 to the global controller (or a DSP of one of the transponders 518, 512, 528, 522). The global controller (or the DSP that received all the waveforms and/or signatures) may then compare the waveforms 610-640 and/or signatures 612-642. For instance, the global controller (or the DSP that received all the waveforms and/or signatures) may determine that the signatures 612-642 in waveforms 610-640 correspond to the same event 560 based on comparison and/or correlations, for example as described above with reference to FIGS. 1-2B.

FIGS. 6A and 6B further show that, while the waveforms 610 and 620 are not provided with synchronized timestamps (likewise waveforms 630 and 640 are not provided with synchronized timestamps), the waveforms 610 and 630 are provided with synchronized timestamps (likewise waveforms 620 and 640 are provided with synchronized timestamps). This may be ensured by analyzing the waveforms 610 and 630 using a common DSP, and analyzing the waveforms 620 and 640 using a common DSP. For example, DSP of transponder 518 and 512 may be part of a same DSP chip with a common clock, and DSP of transponder 528 and DSP of transponder 522 may be part of a same DSP chip with a common clock. Thus, waveforms 610 and 630 have timestamps in the first time base t, waveforms 620 and 640 have timestamps in the second time base t'. Although synchronization may be performed between the two time bases as described above with reference to FIGS. 2A and 2B, synchronization is not necessary.

Instead, dispersion effects may be analyzed for localization, which may be performed by the global controller (or a DSP that received all the waveforms). For instance, referring to FIG. 6A, dispersive effects between the first wavelength $\lambda 1$ and the second wavelength $\lambda 2$ may be known. For example, it may be known that dispersion effects causes light of the first wavelength $\lambda 1$ and light of the second wavelength $\lambda 2$ to travel with a propagation speed difference $\Delta v = v1 - v2$ in the optical fiber. Then, event 560 may be localized based on the timestamps t11 and t13 for the signatures 612 and 632 with the relationships $d\_event\_1 = t11 * v1$ and $d\_event\_1 = t13 * v2$. While it may not be possible to measure the absolute times t11 and t13 at the synchronized receivers 522 and 528, the difference $\Delta t1 = t11 - t13$ may be determined. If the difference in propagation speed due to dispersion and at least the absolute speed v at a reference wavelength are known, then the relationships may be solved for $d\_event\_1 = (v1 * v2 * \Delta t1)/(v1 - v2)$. Likewise, event 560 may be localized based on the timestamps t12' and t14' for the signatures 622 and 642 with the relationships $d\_event\_2 = t12' * v1$, $d\_event\_2 = t14' * v2$, and $\Delta t2 = t12' - t14'$, which may be solved for $d\_event\_2 = (v1 * v2 * \Delta t2)/(v1 - v2)$.

Based on the first estimated location d_event_1 determined using detections via the signatures 612 and 632, and the second estimated location d_event_2 determined using detections via signatures 622 and 642, a more precise estimated location of the event 560 may be determined, without even synchronizing the timestamps between these measurements at nodes 110 and 120. For instance, if d_event_1 and d_event_2 are not the same, the global controller may determine that event 560 occurred somewhere between d_event_1 and d_event_2, which may reduce the uncertainty to within the range of d_event_1 and d_event_2. On the other hand, if d_event_1 and d_event_2 are the same, the global controller may have greater confidence on the localization of the event 560, which is confirmed by localization using two independent light signals.

Although the example of FIG. 5 illustrates using dispersion effects through 2 pairs of transponders transmitting light of two different wavelengths, any of a number of pairs of transponders transmitting light of different wavelengths may be used. For example, transponder 514 at node 110 may be paired with transponder 524 of node 120, which may allow detection and localization of an event in the route 500 using light signals of a third wavelength. This may further reduce the uncertainty in event localization. In a network where many wavelengths may be used to increase achievable capacity, pairing of many transponders transmitting light of different wavelengths may thus greatly improve localization of events within the network. Further, in the example of FIG. 5, each transponder is configured to transmit/receive an optical signal with a single wavelength or carrier, hence two pairs of transponders are used for event detection and localization using dispersion effects. In other examples where a transponder is configured to transmit/receive multiple optical signals with multiple wavelengths, one pair of such transponders may be used for event detection and localization using dispersion effects.

In the example configurations shown in FIGS. 3 and 5, because event detection and localization are performed by transponders and DSPs, which are high-speed components used for data transmission and encoding/decoding, event detection and localization may be performed at a high speed, which allows for detection of fast transients even while they are occurring. Further, because transponders that carry payload data are used to generate waveforms for event detection and localization, the configurations of FIGS. 3 and 5 do not impact the achievable capacity of the route. However, as described above, accuracy of the synchronization may limit accuracy of the localization for the configuration of FIG. 3, although the accuracy may be improved by using triangulation. Accuracy of the localization for the configuration of FIG. 5 may be limited by how well the dispersion effects are known for the system. In another aspect, accuracy in localization may be improved and the need for synchronization may be eliminated by using one or more dedicated transponders that do not carry payload data.

Figure 7:
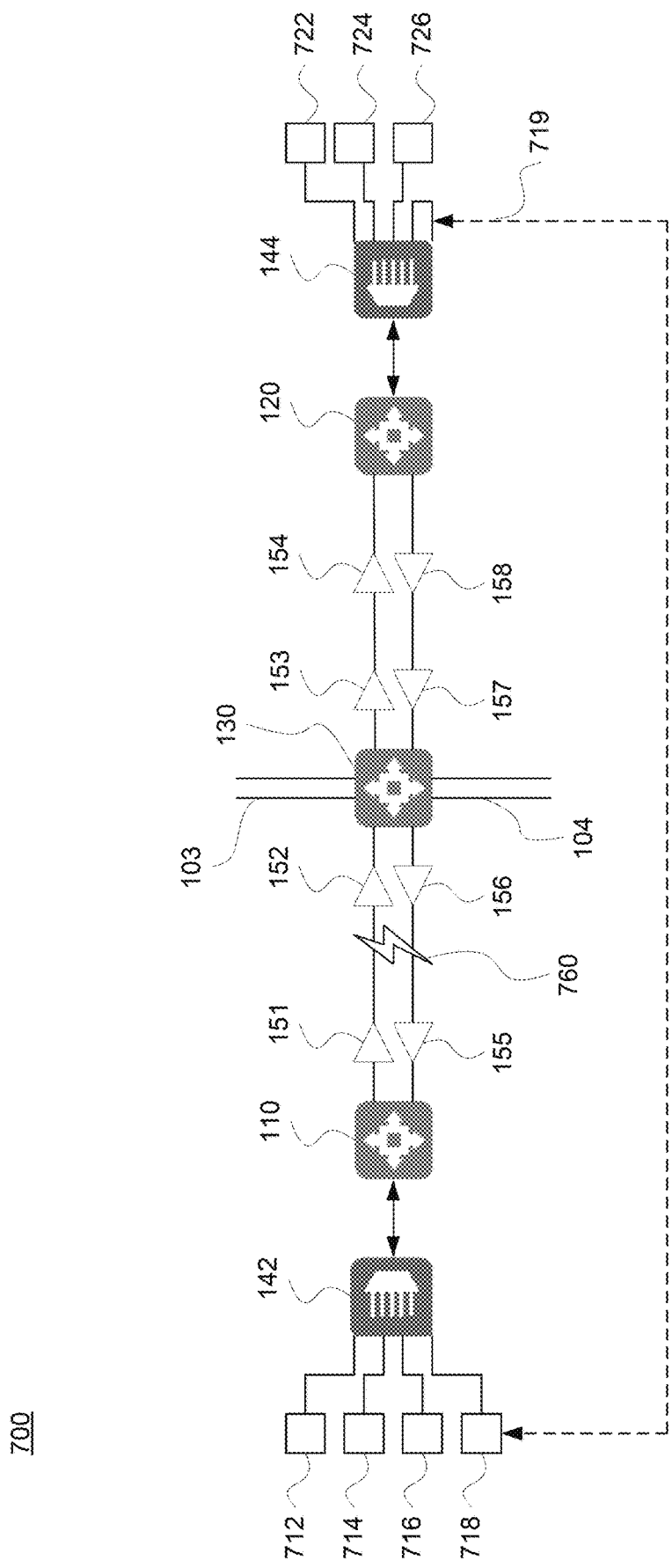
FIG. 7 shows another example route in an optical network in accordance with aspects of the disclosure.

FIG. 7 shows another example route 700 in an optical network in accordance with aspects of the disclosure, which uses a dedicated transponder to improve localization accuracy. Route 700 includes many similar features as route 100 of FIG. 1, and are labeled as such. As shown, route 700 may also include nodes 110, 120, and 130, fibers 101 and 102, add/drop structures 142 and 144, and amplifier 151-158.

However, transponders in the route 700 are configured differently as the transponders of route 100. For instance, instead of pairing transponders from different nodes, one or more dedicated transponders may be used at a node in a loop-back configuration. Thus as shown, light signals transmitted by transponder 718 of node 110 to node 120 is looped back to itself, forming a pair of communication links 719 with itself. Thus, light signal transmitted by transponder 718 traverses route 700 twice. Transponder 718, in this loop-back configuration, is thus dedicated to event detection and localization and cannot carry payload data for communication.

Because in this configuration, the same light signal traverses the route 700 twice, waveforms traveling in both directions should capture the same set of events. For instance, an event 760 in route 700 may be captured in a waveform of light transmitted from transponder 718 to node 120, and may again be captured in a waveform of light transmitted from node 120 back to transponder 718. Because the light signal is simply looped back to the same transponder 718, no synchronization is necessary.

Figure 8A:
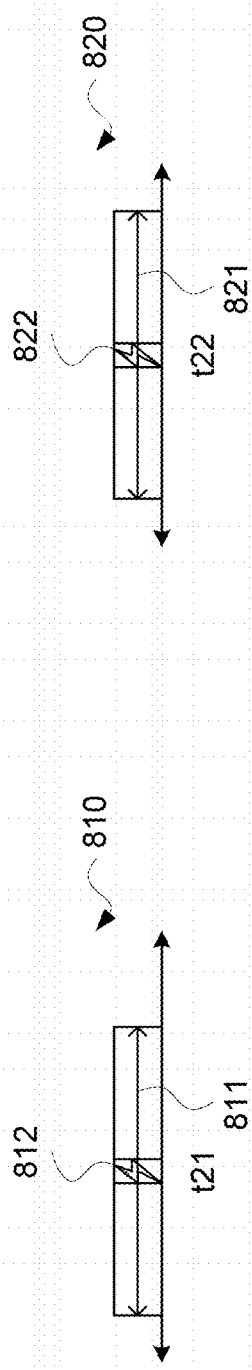
FIGS. 8A and 8B illustrate example detection and localization of an event occurring in the route of FIG. 7.
Figure 8B:
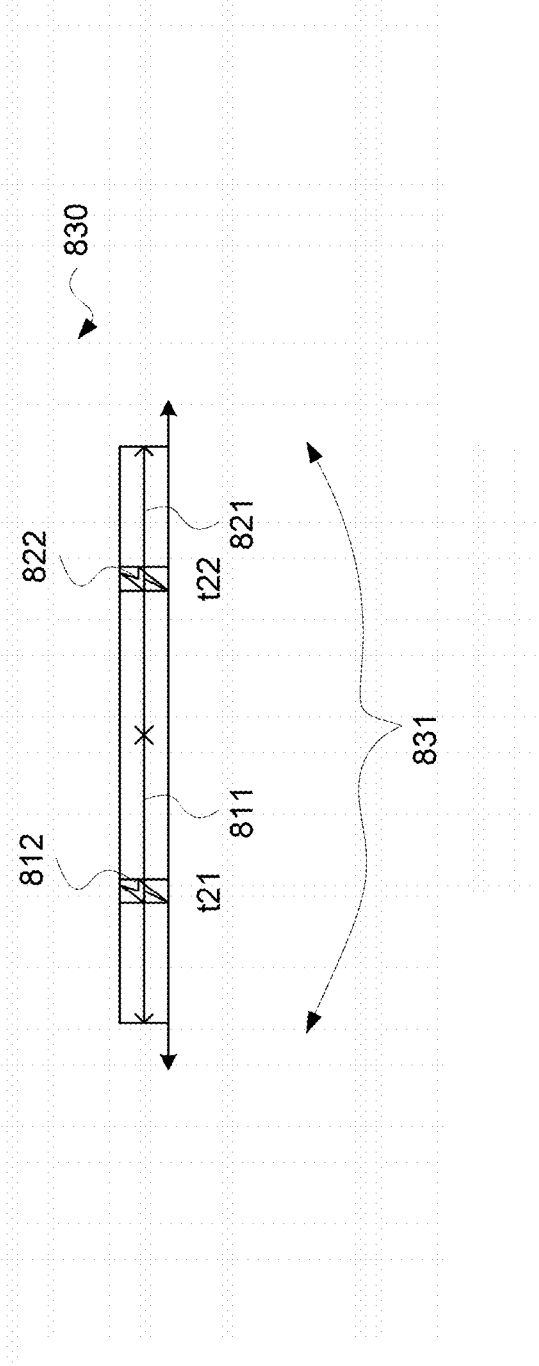

FIGS. 8A and 8B illustrate detection and localization using waveforms detected by a dedicated transponder. As shown, through the dedicated transponder 718, the event 760 may first be captured in a first waveform 810 detected at transponder 718 of node 110 through optical fiber 102 transmitting light towards node 110. This light signal may then traverse through optical fiber 101 towards node 120, and then return back to transponder 718, and captures event 760 in a second waveform 820, which is again detected at transponder 718 of node 110. Further as shown, each of the waveforms 810 and 820 include a respective signature 812 and 822 resulting from the event 860. The DSP may of transponder 718 may receive these waveforms 810 and 820, and determine that the waveforms 810 and 820 correspond to the same event 760 based on comparison and/or correlations, for example as described above with reference to FIGS. 1-2B. The DSP may classify the event 760 as disruptive or not, and optionally a type of disruptive event, for example as described above with reference to FIGS. 1-2B.

Referring to FIG. 8A, since no synchronization is necessary, the event 760 may be localized by the DSP at node 110 (or the global controller) based on the timestamps for the signatures. Note that a global controller may not be needed in this configuration because the signals are looped back to node 110, which may be analyzed by the same DSP at node 110. As shown, the frame 811 and the frame 821 have starting points that are exactly 2d/v apart, because it is the same transponder 718. Thus, based on timestamps for signatures 812 and 821, the event may be localized using the relationships $t21=d\_event/v$, and $t22=[(d-d\_event)+d]/v$, where v is speed of light propagation in the optical fiber, and d is the length of the route 700. Solving the two equations result in the relationship $d\_event=[(t21-t22)*v]/2$, which can be used to localize event 760.

Alternatively, referring to FIG. 8B, a "super frame" may be defined for a round trip for a light signal along the route 700. Thus as shown, a super frame 831 may be defined including both frames 811 and 821. Localization of event 760 may be determined using this super frame 831 in the same way as described above in reference to FIG. 8A, with the relationship $d\_event=[(t21-t22)*v]/2$.

In the example configuration shown in FIG. 7, because a dedicated transponder with a loop-back configuration is used, accuracy of localization is not dependent on synchronization. Eliminating the need for synchronization may also increase detection speed, since less processing is required. Further, as mentioned above, because event detection and localization are performed by a transponder and DSP, which are high-speed components used for data transmission and encoding/decoding, event detection and localization may be performed at a high speed, which allows for detection of fast transients even while they are occurring. This configuration may also avoid the need for using a global controller, or sending waveforms to a DSP at another node, because the signal is looped back to the same node and thus can be analyzed by the same DSP.

Although the example of FIG. 7 illustrates using one dedicated transponder at one node of the route 700, any of a number of dedicated transponders may be used at a node, and such dedicated transponders may be provided at more than one node in a route. Further, the example configurations shown in FIGS. 1, 3, 5 and 7 may be combined in any of a number of ways. For instance, a route may be configured with transponders configured for triangulation as shown in FIG. 3 and for leveraging dispersion effects as shown in FIG. 5. As another example, instead of being paired as shown in FIG. 5, the transponders 512 and 518 may each be configured in a loop-back configuration as shown in FIG. 7. As other examples, the configurations of FIGS. 1, 3, 5, and 7 may be used for different nodes in a route, or for different routes in a network.

FIG. 9 illustrates an example block diagram of some components in a system 900 on a node in an optical network, such as node 110 in route 100. Alternatively, the system 900 may include computing devices on multiple nodes in an optical network, such as nodes 110, 120, 130 in route 100. It should not be considered as limiting the scope of the disclosure or usefulness of the features described herein. In this example, the system 900 is shown with one or more computing devices 910. The computing devices 910 contain one or more processors 920, memory 930 and other components typically present in general purpose computing devices.

The one or more processors 920 can be any conventional processors, such as a commercially available CPU. Alternatively, the processors can be dedicated components such as an application specific integrated circuit ("ASIC") or other hardware-based processor. Although not necessary, one or more of the computing devices 910 may include specialized hardware components to perform specific computing processes. For instance, the one or more processors 920 may include one or more DSPs for analyzing optical signals at the node 110, such as a DSP at each of transponders 112-118, and one or more DSPs for analyzing signals at the node 120, such as a DSP at each of transponders 122-128. The one or more processors 920 may further include a global controller, such as an SDN controller described above.

The memory 930 can be of any non-transitory type capable of storing information accessible by the processor, such as a hard-drive, memory card, ROM, RAM, DVD, CD-ROM, write-capable, and read-only memories. Memory 930 of the computing devices 910 can store information accessible by the one or more processors 920, including data 932 and instructions 934.

Memory 930 can include data 932 that can be retrieved, manipulated or stored by the processors 920. For example, data such as detected waveforms, various parameters, thresholds, ranges, trained models, etc. for detection and localization of events as discussed above with reference to FIGS. 1-8B may be accessible to processors 920.

Memory 930 of the computing devices 910 can also store instructions 934 that can be executed by the one or more processors 920. For instance, instructions for comparing and correlating waveforms for detection and localization of events, and synchronization of time bases as discussed above with respect to the examples shown in FIGS. 1-8B may be performed by the one or more processors 920 according to instructions 934 and data 932 in memory 930.

Data 932 may be retrieved, stored, or modified by the one or more processors 920 in accordance with the instructions 934. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 934 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

Although not shown, computing devices 910 may further include output devices, such as displays (e.g., a monitor having a screen, a touch-screen, a projector, a television, or other device that is operable to display information), speakers, haptics, etc. The computing devices 910 may also include user input devices, such as a mouse, keyboard, touch-screen, microphones, sensors, etc.

Although FIG. 9 functionally illustrates the processor, memory, and other elements of computing devices 910 as being within the same block, the processor, computer computing device, or memory can actually comprise multiple processors, computers, computing devices, or memories that may or may not be stored within the same physical housing. For example, the memory can be a hard drive or other storage media located in housings different from that of the computing devices 910. Accordingly, references to a processor, computer, computing device, or memory will be understood to include references to a collection of processors, computers, computing devices, or memories that may or may not operate in parallel. For example, the computing devices 910 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 910 may be capable of directly and indirectly communicating with other nodes of an optical network, such as computing devices at nodes 120 and 130 of FIG. 1, user computing devices, etc. Computing devices in the optical network, such as computing devices 910, may be interconnected using various protocols and systems, such that computing devices in the optical network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 10:
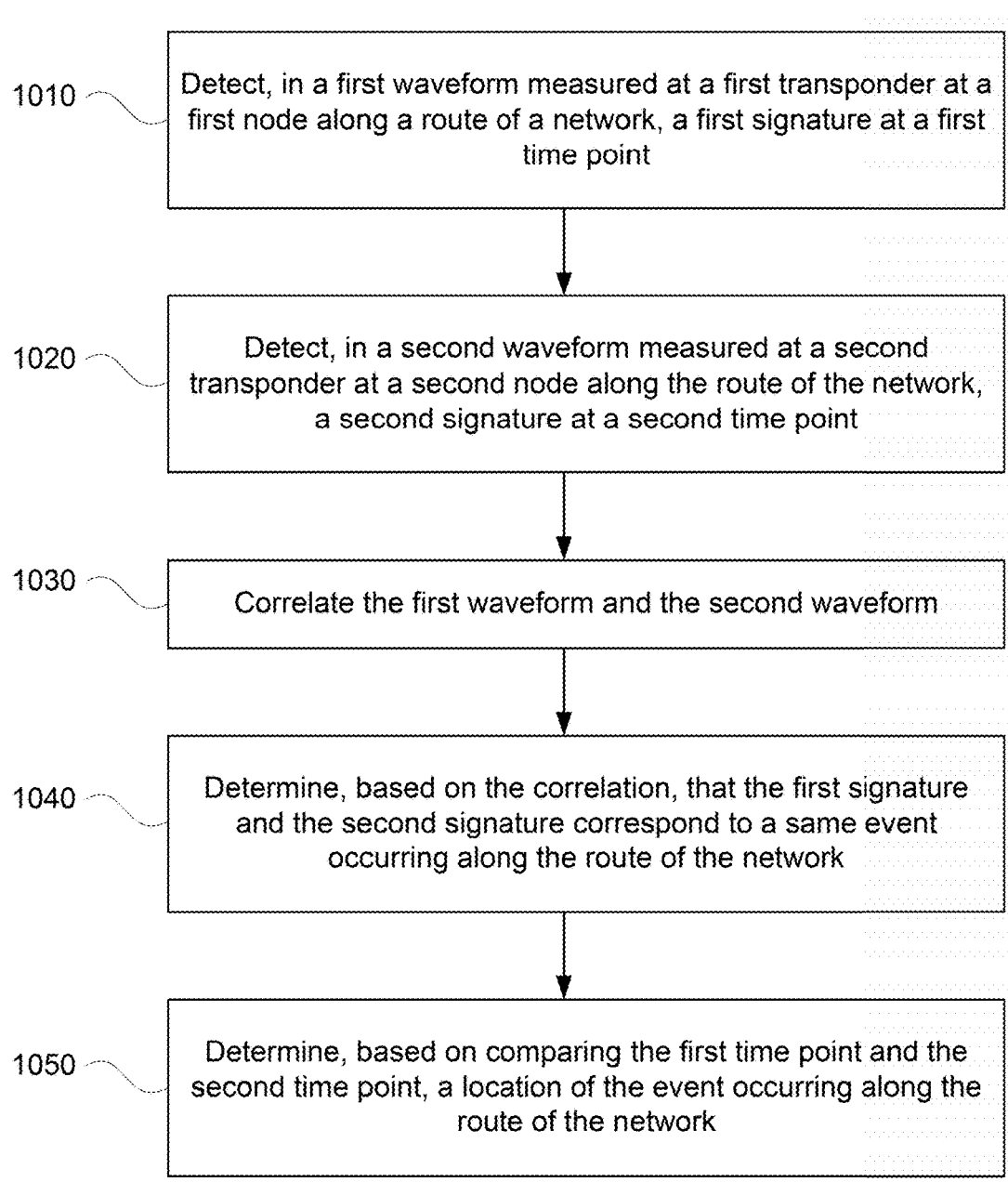
FIG. 10 is a flow diagram in accordance with aspects of the disclosure.

FIG. 10 shows an example flow diagram illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

For instance, the flow diagram 1000 may be performed by one or more nodes in an optical network, such as by processors 920 of FIG. 9. As mentioned above in reference to FIG. 9, the processors 920 may be on one node, such as node 110, or multiple nodes, such as nodes 110, 120, 130, etc., and/or may be located at other additional/alternative locations. As such, processors 920 may receive optical signals, based on which detection and localization of events may be made as described above with reference to FIGS. 1-8B.

Referring to FIG. 10, at block 1010, in a first waveform measured at a first transponder at a first node along a route of a network, a first signature is detected at a first time point. For example as shown in FIGS. 1 and 2A, first waveform 210 may be measured at transponder 118 of node 110, and first signature 212 may be detected by the one or more processors 920 in the first waveform 210 at a first time point t1. At block 1020, in a second waveform measured at a second transponder at a second node along the route of the network, a second signature is detected at a second time point. For example as shown in FIGS. 1 and 2A, second waveform 220 may be measured at transponder 128 of node 120, and second signature 222 may be detected by the one or more processors 920 in the second waveform 220 at a second time point t2.

At block 1030, the first waveform and the second waveform are correlated. For example as described with reference to FIGS. 1 and 2A, processors 920 may correlate the first waveform 210 with the second waveform 220.

At block 1040, it is determined based on the correlation that the first signature and the second signature corresponds to a same event occurring along the route of the network. For example as described with reference to FIGS. 1 and 2A, based on correlation between the first waveform 210 with the second waveform 220, the processors 920 may determine whether the first signature 212 and the second signature 222 correspond to the same event 160.

At block 1050, it is determined based on the first time point and the second time point, a location of the event occurring along the route of the network. For example as described with reference to FIGS. 1 and 2A, based on the first time point t1 and the second time point t2, the processors 920 may determine a location of the same event 160. In some instances as described with reference to FIGS. 2A and 2B, synchronization may be performed to correct the time points to a common time base before determining the location of the event.

Once a disruptive event is detected and localized, information on the disruptive event may be outputted. For example, processors 920, such as the global controller or the DSP that performed the detection and localization may generate output on the detected disruptive event. The output may include information such as type of event, time of event, estimated location of the event, suggestions on handling the event, etc. The output may be in any format, such as texts, messages, alerts, logs, and may include graphics, sounds, haptics, etc. In this regard, the processors 920 may be in communication with one or more output devices, such as a display, speakers, touch screen, etc., and/or may be in communication with other computing devices that include output devices, such as computing devices of a network operator.

Although FIG. 10 illustrates an example method using two transponders, variations of the method may be performed using more than two transponders. For example, triangulation may be performed for event detection and localization between more than two transponders as described with reference to FIG. 3, and dispersion effects may be leveraged for event detection and localization as described with reference to FIG. 5. Alternatively, localization may be performed using one dedicated transponder in a loop-back configuration as described with reference to FIG. 7.

The technology is advantageous because event detection and localization may be performed at a high speed using high speed components such as transponders and DSPs, which allows for detection of fast transients even while they are occurring. In instances where transponders carrying payload data are further used to generate waveforms for event detection and localization, achievable capacity of the network is not impacted. Where multiple transponders at different nodes are used for event localization, accuracy of localization may be improved by using triangulation. In other instances, accuracy in localization may be improved and the need for synchronization may be eliminated by using dispersion effects and/or using one or more dedicated transponders that do not carry payload data.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   a first transponder at a first node along a route of a network;
   a second transponder at a second node along the route of the network;
   a third transponder at a third node along the route of the network;
   a fourth transponder at the second node; and
   one or more processors configured to:
      detect, in a first waveform measured at the first transponder, a first signature at a first time point;
      detect, in a second waveform measured at the second transponder, a second signature at a second time point;
      correlate the first waveform and the second waveform;
      determine, based on the correlation, that the first signature and the second signature correspond to a same event occurring along the route of the network;
      determine, based on comparing the first time point and the second time point, an estimated location of the event occurring along the route of the network;
      detect, in a third waveform measured at the third transponder, a third signature at a third time point;
      detect, in a fourth waveform measured at the fourth transponder, a fourth signature at a fourth time point; and
      correlate the third waveform with the fourth waveform, and at least one of the third waveform or the fourth waveform with at least one of the first waveform or the second waveform.

2. The system of claim 1, wherein the one or more processors are further configured to:
   determine, based on at least one of the first signature or the second signature, that a type of the event is at least one of: a change in state of polarization, polarization mode dispersion, variation in birefringence, change in optical power, or change in carrier phase.

3. The system of claim 1, wherein the one or more processors are further configured to:
   determine, based on at least one of the first signature or the second signature, that a type of the event is at least one of: movements, vibrations, or mechanical stress on an optical fiber in the route of the network.

4. The system of claim 1, wherein the one or more processors are further configured to determine a type of the event based on at least one of the first signature or the second signature using one or more trained machine learning models.

5. The system of claim 1, wherein the one or more processors are further configured to:
   synchronize timestamps received for the first waveform with timestamps received for the second waveform to a common time base.

6. The system of claim 1, wherein the first waveform and the second waveform are measured from light signals carrying payload data.

7. The system of claim 1, further comprising:
   wherein the third transponder and the fourth transponder are configured to form a pair of communication links that are separate from a pair of communication links between the first transponder and the second transponder;
   wherein the one or more processors are further configured to:
      determine, based on the correlations, that the third signature and the fourth signature correspond to the same event occurring along the route of the network;
      determine, based on comparing the first time point with the second time point, a first estimated location of the event along the route in the network;

determine, based on comparing the third time point with the fourth time point, a second estimated location of the event along the route in the network;

determine the estimated location further based on the first estimated location and the second estimated location.

8. The method of claim 7, wherein the one or more processors are further configured to:

synchronize timestamps received for the third waveform and timestamps received for the fourth waveform to a common time base as timestamps received for the first waveform or a common time base as timestamps received for the second waveform.

9. The system of claim 1, further comprising:

wherein the third transponder and the fourth transponder are configured to transmit light of a second wavelength different from a first wavelength that the first transponder and the second transponder are configured to transmit;

wherein the one or more processors are further configured to:

determine, based on the correlations, that the third signature and the fourth signature correspond to the same event occurring along the route of the network;

determine, based on comparing the third time point with the first time point and based on propagation speed difference between the first wavelength and the second wavelength, a first estimated location of the event along the route in the network;

determine, based on comparing the fourth time point with the second time point and based on the propagation speed difference between the first wavelength and the second wavelength, a second estimated location of the event along the route in the network;

determine the estimated location further based on the first estimated location and the second estimated location.

10. The system of claim 1, wherein the one or more processors include a global controller and one or more DSPs located at the first node and the second node.

11. A system, comprising:

a first transponder at a first node along a route of a network, the first transponder is configured with a loop-back configuration at a second node along the route of the network;

a second transponder at a third node along the route of the network, the second transponder configured with a loopback configuration at a fourth node along the route of the network; and one or more processors configured to:

detect, in a first waveform measured at the first transponder, a first signature at a first time point;

detect, in a second waveform measured at the first transponder, a second signature at a second time point;

detect, in a third waveform measured at the second transponder, a third signature at a third time point;

detect, in a fourth waveform measured at the second transponder, a fourth signature at a fourth time point;

correlate the first waveform and the second waveform;

correlate the third waveform with the fourth waveform, and at least one of the third waveform or the fourth waveform with at least one of the first waveform or the second waveform;

determine, based on the correlation, that the first signature and the second signature correspond to a same event occurring along the route in the network; and determine, based on comparing the first time point and the second time point, an estimated location of the event occurring along the route of the network.

12. The system of claim 11, wherein the first signature is measured in a first frame of light signals, and the second signature is measured in a second frame after the first light signals have traversed through the route twice.

13. The system of claim 11, wherein the first signature and the second signature are measured in a frame of light signals that encompasses the route twice.

14. The system of claim 11, wherein the one or more processors are further configured to:

determine, based on at least one of the first signature or the second signature, that a type of the event is at least one of: movements, vibrations, or mechanical stress on an optical fiber in the route of the network.

15. The system of claim 11, wherein the one or more processors are further configured to determine a type of the event based on at least one of the first signature or the second signature using one or more trained machine learning models.

16. A method, comprising:

detecting, by the one or more processors in a first waveform measured at a first transponder at a first node along a route of a network, a first signature at a first time point;

detecting, by the one or more processors in a second waveform measured at a second transponder at a second node along the route of the network, a second signature at a second time point;

correlating, by the one or more processors, the first waveform and the second waveform;

correlating, by the one or more processors, the third waveform with the fourth waveform, and at least one of the third waveform or the fourth waveform with at least one of the first waveform or the second waveform determining, by the one or more processors based on the correlation, that the first signature and the second signature correspond to a same event occurring along the route in the network;

determining, by the one or more processors based on comparing the first time point and the second time point, an estimated location of the event occurring along the route in the network;

detecting, by the one or more processors, in a third waveform measured at a third transponder via a first communication link between the third transponder and a fourth transponder at the second node, a third signature at a third time point; and detecting, by the one or more processors in a fourth waveform measured at the fourth transponder via a second communication link between the third transponder and the fourth transponder, a fourth signature at a fourth time point.

17. The method of claim 16, further comprising:

determining, by the one or more processors based on at least one of the first signature or the second signature, that a type of the event is at least one of: a change in state of polarization, polarization mode dispersion, variation in birefringence, change in optical power, or change in carrier phase.

18. The method of claim 16, further comprising:

determining, by the one or more processors based on at least one of the first signature or the second signature, that a type of the event is at least one of: movements, vibrations, or mechanical stress on an optical fiber in the route of the network.

19. The method of claim 16, further comprising:

determining, by the one or more processors based on the correlations, that the third signature and the fourth signature correspond to the same event occurring along the route of the network;

determining, by the one or more processors based on comparing the first time point with the second time point, a first estimated location of the event along the route in the network;

determining, by the one or more processors based on comparing the third time point with the fourth time point, a second estimated location of the event along the route in the network;

determining, by the one or more processors, the estimated location further based on the first estimated location and the second estimated location.

20. The method of claim 16, determining, by the one or more processors based on the correlations, that the third signature and the fourth signature correspond to the same event occurring along the route of the network;

determining, by the one or more processors based on comparing the third time point with the first time point and based on propagation speed difference between the first wavelength and the second wavelength, a first estimated location of the event along the route in the network;

determining, by the one or more processors based on comparing the fourth time point with the second time point and based on propagation speed difference between the first wavelength and the second wavelength, a second estimated location of the event along the route in the network;

determining, by the one or more processors, the estimated location further based on the first estimated location and the second estimated location.

* * * * *